(12) United States Patent
Ueda et al.

(10) Patent No.: US 6,577,912 B1
(45) Date of Patent: Jun. 10, 2003

(54) COMPUTER DEVICE FOR PRODUCTION EQUIPMENT

(75) Inventors: Tomiyasu Ueda, Nakakoma-gun (JP); Hiroshi Sato, Kofu (JP); Seishiro Yanachi, Kofu (JP)

(73) Assignee: Matsushita Electric Industrial Co., LTD, Osaka-fu (JP)

( * ) Notice: Subject to any disclaimer, the term of this patent is extended or adjusted under 35 U.S.C. 154(b) by 0 days.

(21) Appl. No.: 09/479,481

(22) Filed: Jan. 10, 2000

(30) Foreign Application Priority Data

Jan. 13, 1999 (JP) ............................................. 11-005977

(51) Int. Cl.[7] .............................. G06F 19/00; H02H 3/05
(52) U.S. Cl. ........................ 700/117; 700/82; 711/162; 714/6
(58) Field of Search ................................ 714/6; 711/161, 711/162; 707/204; 700/79, 82, 96, 117, 121

(56) References Cited

U.S. PATENT DOCUMENTS

| | | | |
|---|---|---|---|
| 4,631,661 A | | 12/1986 | Eibach et al. .................. 714/10 |
| 4,638,129 A | * | 1/1987 | Partus et al. ............. 200/43.22 |
| 4,941,087 A | * | 7/1990 | Kap .............................. 700/82 |
| 5,212,784 A | * | 5/1993 | Sparks ........................... 714/6 |
| 5,505,777 A | | 4/1996 | Ciardella et al. ............ 118/663 |
| 5,887,128 A | * | 3/1999 | Iwasa et al. ..................... 714/6 |
| 5,930,140 A | * | 7/1999 | Asai et al. ................... 700/121 |
| 5,993,916 A | * | 11/1999 | Zhao et al. .................. 427/535 |
| 5,999,072 A | * | 12/1999 | Slavik ......................... 335/207 |
| 6,374,146 B1 | * | 4/2002 | Oyama et al. ................. 700/59 |

OTHER PUBLICATIONS

Automatic IPL Drive Switch, IBM Technical Disclosure Bulletin, vol. 37, No. 07, Jul. 1994.

* cited by examiner

Primary Examiner—Maria N. Von Buhr
Assistant Examiner—Paul Rodriguez (57) ABSTRACT

A computer device 1 for production equipment comprises an arithmetic unit 10, an input device 11 for inputting operation data, a display device 12 for displaying operation data, and an HDD device 13 for storing an arithmetic unit 10 executed processing program, and operation results. In the HDD device 13, there are provided a main drive unit and a backup drive unit, which are constituted so as to maintain the same contents, and to selectively connect the arithmetic unit 10 to one of the drive units inside the HDD device 13, a drive unit selecting circuit 2 is provided on the HDD device 13 side, and a switch for switching this drive unit selecting circuit 2 is provided on the outside of the computer device 1.

9 Claims, 11 Drawing Sheets

COMPUTER DEVICE FOR PRODUCTION EQUIPMENT

BACKGROUND OF THE INVENTION

1. Technical Field of the Invention

The present invention relates to a computer device installed in production equipment such as a component mounting apparatus, component transfer apparatus, and reflow apparatus, and more particularly to a computer device which is capable of being restored in a short period of time even when a hard disk drive device crash or other failure occurs.

2. Description of Related Art

A conventional computer device for production equipment that is installed in a component mounting apparatus, by way of example, will be described with reference to FIG. 7 through FIG. 10.

Figure 10:
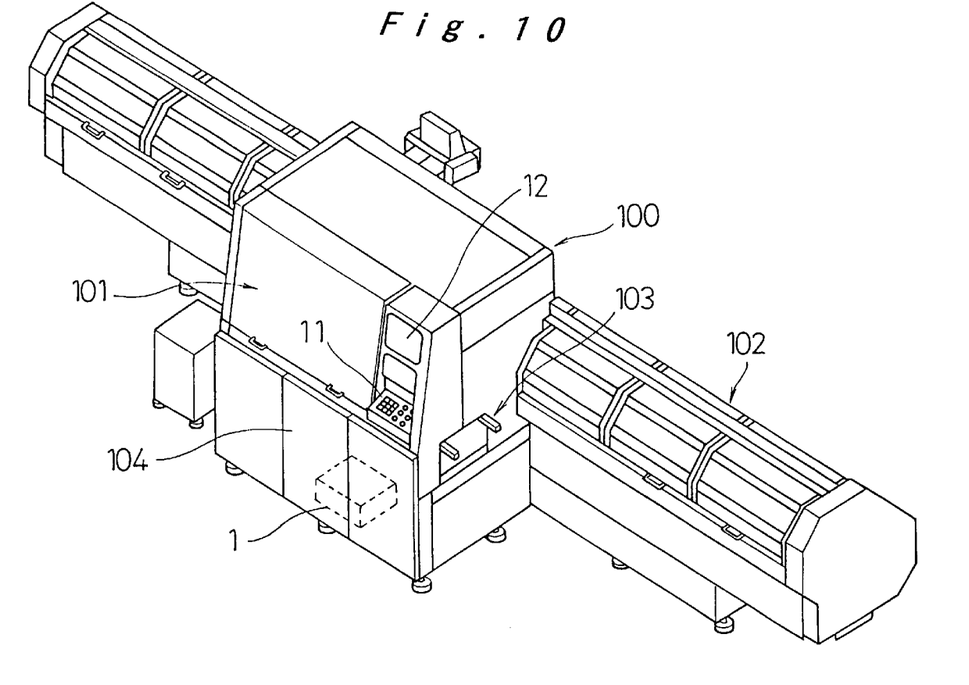
FIG. 10 is a schematic perspective view of a component mounting apparatus.

The component mounting apparatus 100 shown in FIG. 10 comprises a component mounting section 101, a component feeding section 102, a substrate loading section 103, an input device 11, a display device 12, and a computer device (shown by dotted lines) that is installed inside of the main unit of the component mounting apparatus 100. A multiplicity of parts cassettes are accommodated in the component mounting section 102, and the parts cassette containing a desired type of electronic components is transferred to a predetermined component removal location. The substrate loading section 103 is constituted such that a printed circuit board is loaded onto an X-Y table located at a component mounting position and the printed circuit board on which electronic components have been mounted is carried out of the X-Y table. The component mounting section 101 includes a mounting head for removing electronic components from the parts cassette at the component removal location and for mounting the electronic components at a mounting position on the printed circuit board positioned at a predetermined location by the X-Y table, and a camera for image recognition of components.

The computer device performs the functions of coordinating the mounting operation and of processing data such as inputting, outputting, and editing of the component mounting data. A hard disk drive (HDD) device of the computer device stores the component mounting data such as data on the shapes of components, mounting positions, image recognition of components, and parts cassettes. Also, data required for production control for monitoring the operating conditions of the apparatus, production results, and various features such as the rate of successful pick-up of components by suction are stored in the HDD device. The computer device also has a graphic user interface function that contributes to the user-friendly operability of the component mounting apparatus together with the input device 11 and display device 12. Also stored in the HDD device of the computer device is error logging data in which details of any abnormality and the conditions of the apparatus at the time the apparatus has stopped operating are recorded for the purpose of reducing the time for restoration whenever a trouble occurs.

The computer device thus enables: reduction of time for switching the type of product from one to another; minimization of a down time of the apparatus when an abnormality occurs; manufacture of products of highly controlled quality; and maximization of productivity per unit hour.

Figure 7:
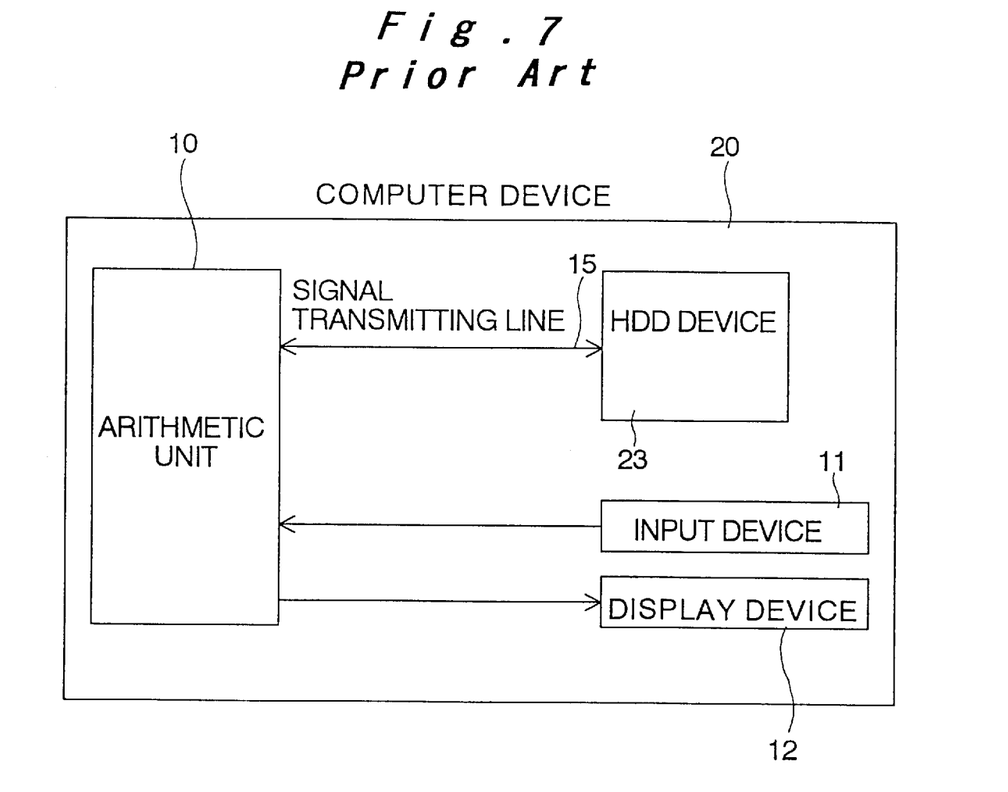
FIG. 7 is a block diagram showing the constitution of an example of a conventional computer device.

FIG. 7 shows a conventional computer device 20 used in component mounting apparatuses such as the one shown in FIG. 10. The computer device 20 comprises an arithmetic unit 10, an input device 11 for inputting operation data, a display device 12 for displaying operation data, and a hard disk drive device (hereinafter referred to simply as HDD device) 23 for storing a processing program, and operation data. A signal transmitting line 15 between the arithmetic unit 10 and the HDD device 23 is composed of a data bus for transmitting and receiving data, an address bus for specifying a data read/write address, and a master drive unit/slave drive unit selecting signal.

Figure 8:
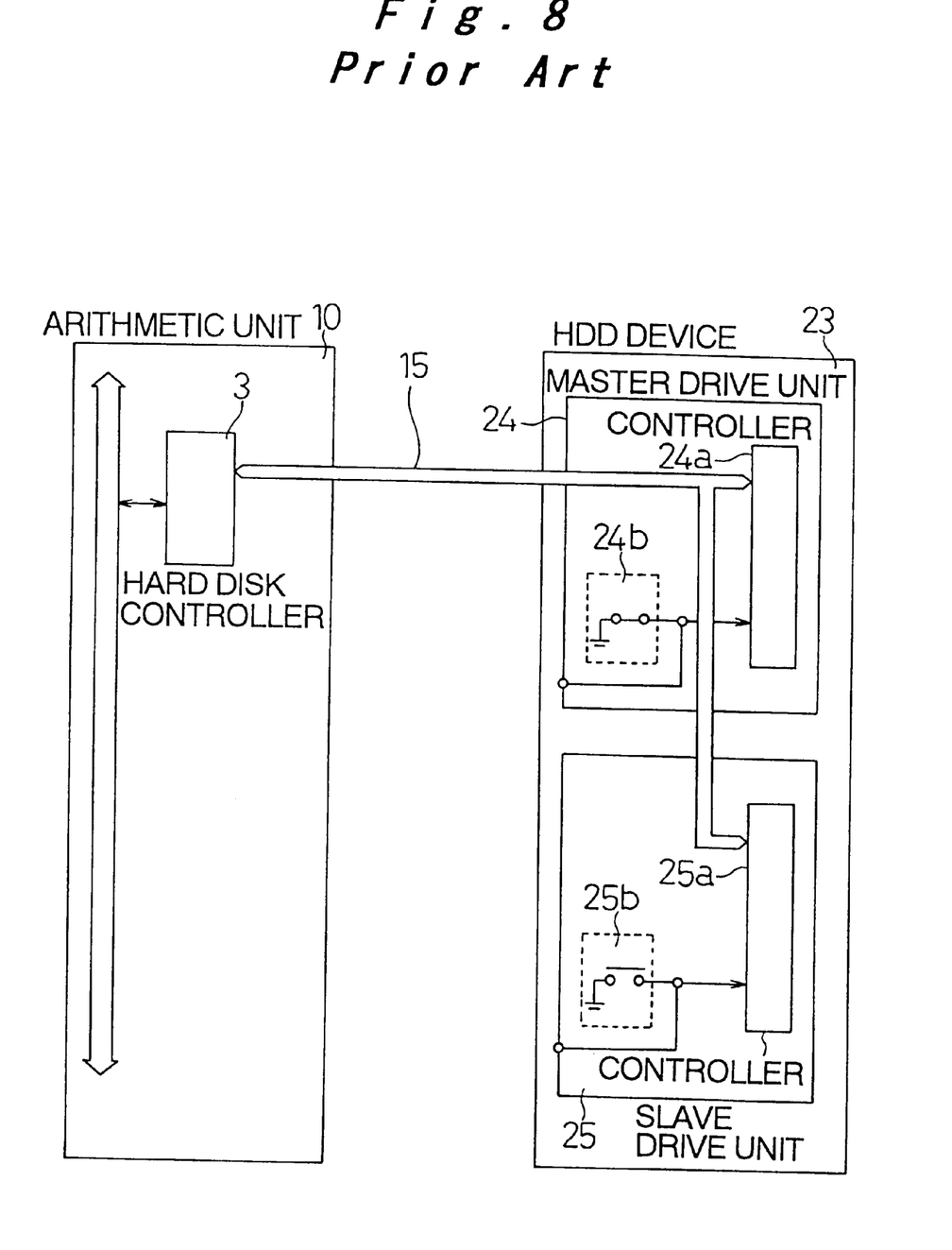
FIG. 8 is a circuit diagram showing the constitution of signal transmission in a conventional example.

In FIG. 8, which shows a circuit diagram of the signal transmission of the computer device 20, normally at least two hard disk drives of a master drive unit 24 and a slave drive unit 25 are provided in the HDD device 23. A hard disk controller 3 of the inside of the arithmetic unit 10 is connected via a signal transmitting line 15 to a controller 24a inside the master drive unit 24, and a controller 25a inside the slave drive unit 25 on the inside of the HDD device 23, and performs the reading and writing of data to the drive units 24, 25.

The selection of the master/slave drive unit inside the HDD device 23 from the arithmetic unit 10 is performed by setting master/slave selecting circuits 24b, 25b inside the master drive unit 24 and slave drive unit 25. More specifically, selection is performed by setting selecting switches inside the master/slave selecting circuits to either short-circuited or open.

Figure 9:
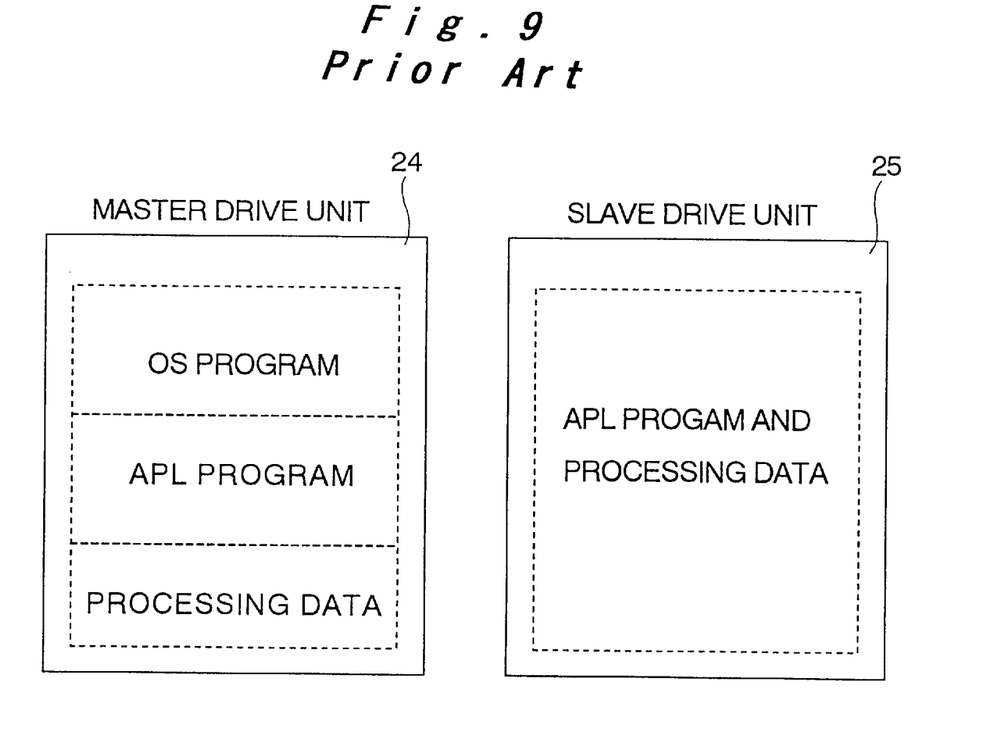
FIG. 9 is a schematic diagram of a program storage state of a master drive unit and backup drive unit in a conventional example.

FIG. 9 shows the programs stored inside the master drive unit 24 and the slave drive unit 25 on the inside the HDD device 23. In the master drive unit 24, there is stored an operating system program including a device driver program (hereinafter referred to simply as OS program) required to start up the computer system, an application program (hereinafter referred to simply as APL program) for describing computer processing contents, and APL program processing data such as component mounting data, information for production control, and error logging data. Further, in the slave drive unit 25, there is stored an APL program and APL program processing data that cannot be stored in the master drive unit 24.

In fact, if storage space for all APL programs and APL program processing data can be secured in the master drive unit 24, the slave drive unit 25 is not necessary, and the HDD device 23 can be constituted solely by a master drive unit 24.

When a computer device of a constitution such as that described above is used as either part of, or as an entire controller for production equipment such as a component mounting apparatus, which mounts an electronic component at a predetermined location on a printed circuit board, since the production equipment must be made smaller, the installation site of the computer device is generally a location inside the apparatus main unit. Further, because the mounting speed of the component mounting apparatus is becoming increasingly faster, a motor that drives an X-Y table generally operates by abruptly increasing and decreasing speed, and motor capacity is generally large. Moreover, the component mounting apparatus is quite often kept in operation for 24 hours a day in succession, during which reading and writing of data are continuously performed in the computer device.

If the computer device is installed inside of a main unit of production equipment, the HDD device, which stores the OS program required for computer system startup, an APL program for describing the contents of computer processing, and APL program processing data, is affected by vibration from the equipment, a lightning-induced power outage, and noise from the motor and surrounding equipment, and there is a possibility that the HDD device itself will succumb to mechanical failure, or that the data inside the HDD device will be destroyed. As a result thereof, there is the danger that the computer device will lose it's ability to start up normally.

In this case, the problem is that, as repair work, because it is necessary to prepare a normal master drive unit, in which an OS program, APL program, and APL program processing data have been stored beforehand, and to replace the malfunctioning master drive unit with the normal master drive unit, a lot of time is required. Specifically, if the HDD device breaks down, the computer device will have to be first removed from the apparatus main unit of production equipment, after which the HDD device must be taken out of the computer device and be replaced with a new HDD device. Then the OS program, APL program, and APL program processing data must be installed in the new HDD device. It will take some 12 hours for all these restoration work. In case there is no backup data of the APL program processing data, it is further necessary to prepare the data for the mounting operation, which will take another 12 hours.

SUMMARY OF THE INVENTION

With the foregoing problems with prior art in view, it is an object of the present invention to provide a computer device for production equipment capable of being restored in a short period of time when a malfunction occurs in the HDD device.

The computer device of the present invention is installed in an apparatus main unit of production equipment and comprises an arithmetic unit, an input device for inputting operation data, a display device for outputting operation data, and a hard disk drive device which stores a processing program and operation data. The arithmetic unit executes data processing in accordance with the data processing program inside the hard disk drive device, and stores an operation result in the hard disk drive device. The hard disk drive device has two or more drive units including a main drive unit and a backup drive unit. In the main drive unit, there is stored an operating system program, an application program, and application program processing data, and in the backup drive unit, there is stored exactly the same programs and data as are in the main drive unit including the operating system program. The computer system is programmed so that, after computer system startup, the results of data processing executed by the arithmetic unit are written to both a main drive unit and a backup drive unit as new processing data. Furthermore, to selectively connect the arithmetic unit with one of the drive units inside the hard disk drive device, a drive unit selecting circuit is provided on the hard disk drive device side, and a switch for switching this drive unit selecting circuit is provided on the outside of the computer device.

According to the above constitution, the current drive unit connected to the arithmetic unit can be easily changed from a malfunctioning drive unit to a separate, normal drive unit inside the HDD device in a short period of time by operating a switch provided on the outside of the computer device, for example, on the front surface of the computer device in the apparatus main unit of production equipment. Further, because the contents of the backup drive unit are kept the same as the contents of the main drive unit, the computer device can be restarted in accordance with the OS program of the backup drive unit, and processing can be continued in accordance with the APL program and APL program processing data of the backup drive unit. Further, because the most recent processing data of immediately prior to a shutdown resulting from a malfunction is stored in the processing data of the APL program, processing can be continued immediately.

Further, when this computer device is used as either part of, or as an entire controller in a component mounting apparatus, which mounts an electronic component on a printed circuit board, even if the HDD device should fail under the effects of vibration from the equipment, a lightning-induced power outage, or noise from the motor and surrounding equipment, mounting operations can be continued by simply operating a switch, without altering software settings, or changing an APL program, or replacing the HDD device. Particularly in a component mounting apparatus, the time for restoration work when the HDD device breaks down can be remarkably reduced from 12–24 hours in prior art to 10–30 minutes.

The computer device of the present invention should not necessarily be used for production equipment but can of course be applied to any other purposes.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF PREFERRED EMBODIMENTS

One embodiment of the present invention, in which the computer device is applied to the controller of a component mounting apparatus, will be described hereinbelow with reference to FIG. 1 through FIG. 6, and FIG. 10 through FIG. 12.

FIG. 10 shows a component mounting apparatus 100, inside of which the computer device 1 is installed. The construction of the component mounting apparatus 100 have already been described and thus will be no more described.

Figure 1:
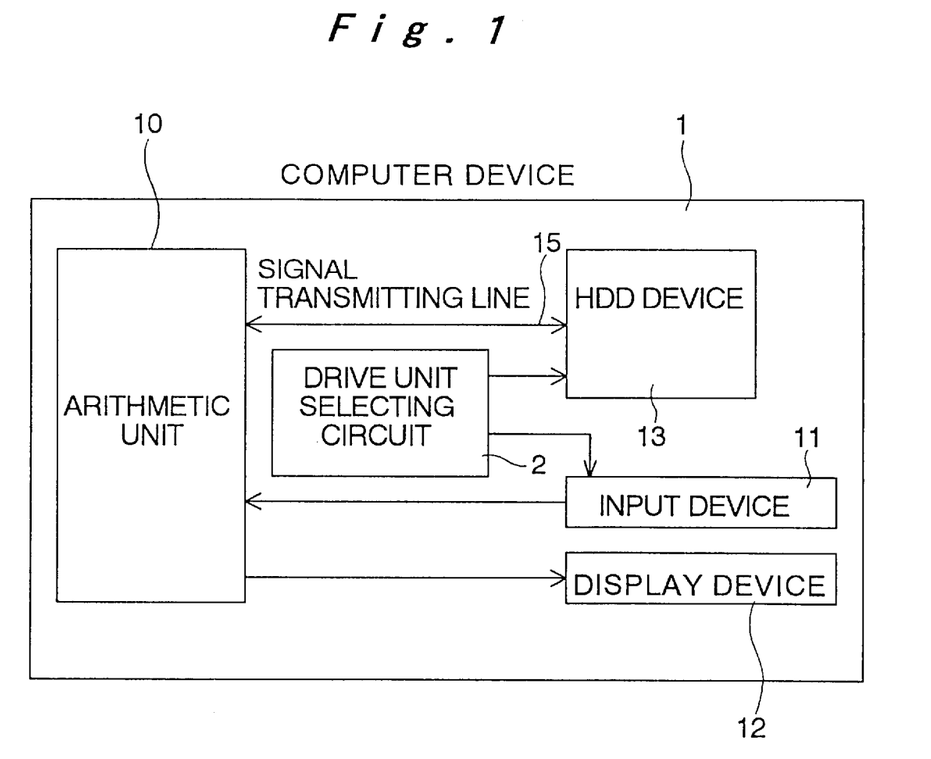
FIG. 1 is a block diagram showing the constitution of a first aspect of the embodiment of a computer device of the present invention.
Figure 11:
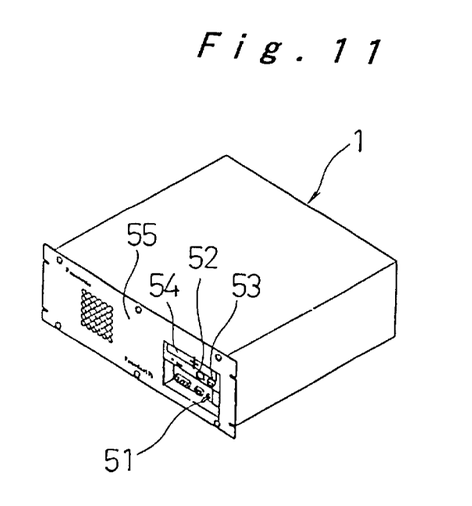
FIG. 11 is a perspective view of external appearance of the computer device of the present invention.

FIG. 1 shows the basic constitution of the computer device 1 of the present invention. This computer device 1 constitutes an arithmetic unit 10, an input device 11 for inputting operation data, a display device 12 for displaying operation data, an HDD device 13 for storing a processing program and operation data, and a drive unit selecting circuit 2 for selecting one drive unit within the HDD device 13. Further, a switch 51 for switching this drive unit selecting circuit 2 is provided on the front surface of the computer device 1 as shown in FIGS. 11 and 12.

Figure 12:
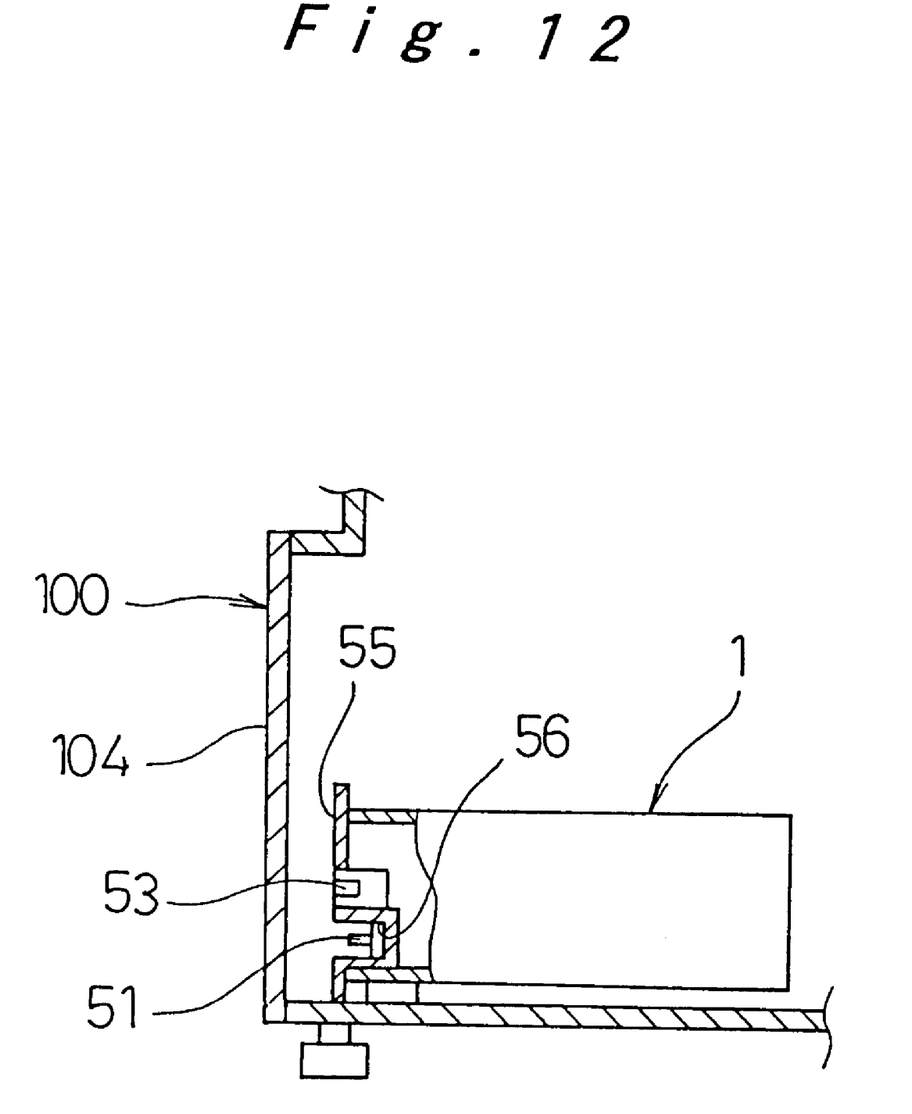
FIG. 12 is a cross sectional view showing how the computer device is installed in the apparatus main unit.

More specifically, the switch 51 is provided at a lower part on the front side of the computer device 1, that is, inside of a concavity 56 formed in a lower portion of a front panel 55 as shown in FIG. 12. This construction facilitates the restoration work whenever the HDD device 13 needs repair, since the operator can reach the switch 51 by opening the front door 104 of the component mounting apparatus 100. On the other hand, the switch 51 should preferably be located within a recess on the front side of the computer device 1 so that the operator will not touch it by mistake. That is, the switch 51 is disposed such that it can only be operated by using a simple tool such as a screwdriver, thereby preventing inadvertent operation of the switch by the operator.

As long as the switch 51 of the drive unit selecting circuit 2 is on the outside of the computer device, it does not particularly have to be on the front surface, but rather can be on a side surface portion, or the back surface of the computer device.

If the computer device 1 is installed in a hard-to-reach location inside the main unit of a component mounting apparatus, the switch 51 may be provided on the outside surface portion of the apparatus main unit where it can be readily operated.

On the front panel 55 of the computer device 1 are provided a pair of indication lamps 52, 53 for indicating which one of the drive units in the HDD device 13 is being used, and an indicator 54 for indicating that reading and writing of data is being performed in the HDD device 13. The indication lamps 52, 53 respectively indicate the current use of a main drive unit 4a and a backup drive unit 4b to be described later. For that purpose the drive unit selecting circuit 2 is also connected to the input device 11 of the computer device 1, whereby the switching of drive units is informed to the arithmetic unit 10 and is indicated by the indication lamps 52, 53. Further, thanks to the indicator 54, the switch is prevented from being operated by mistake while the HDD device 13 is being accessed.

Figure 2:
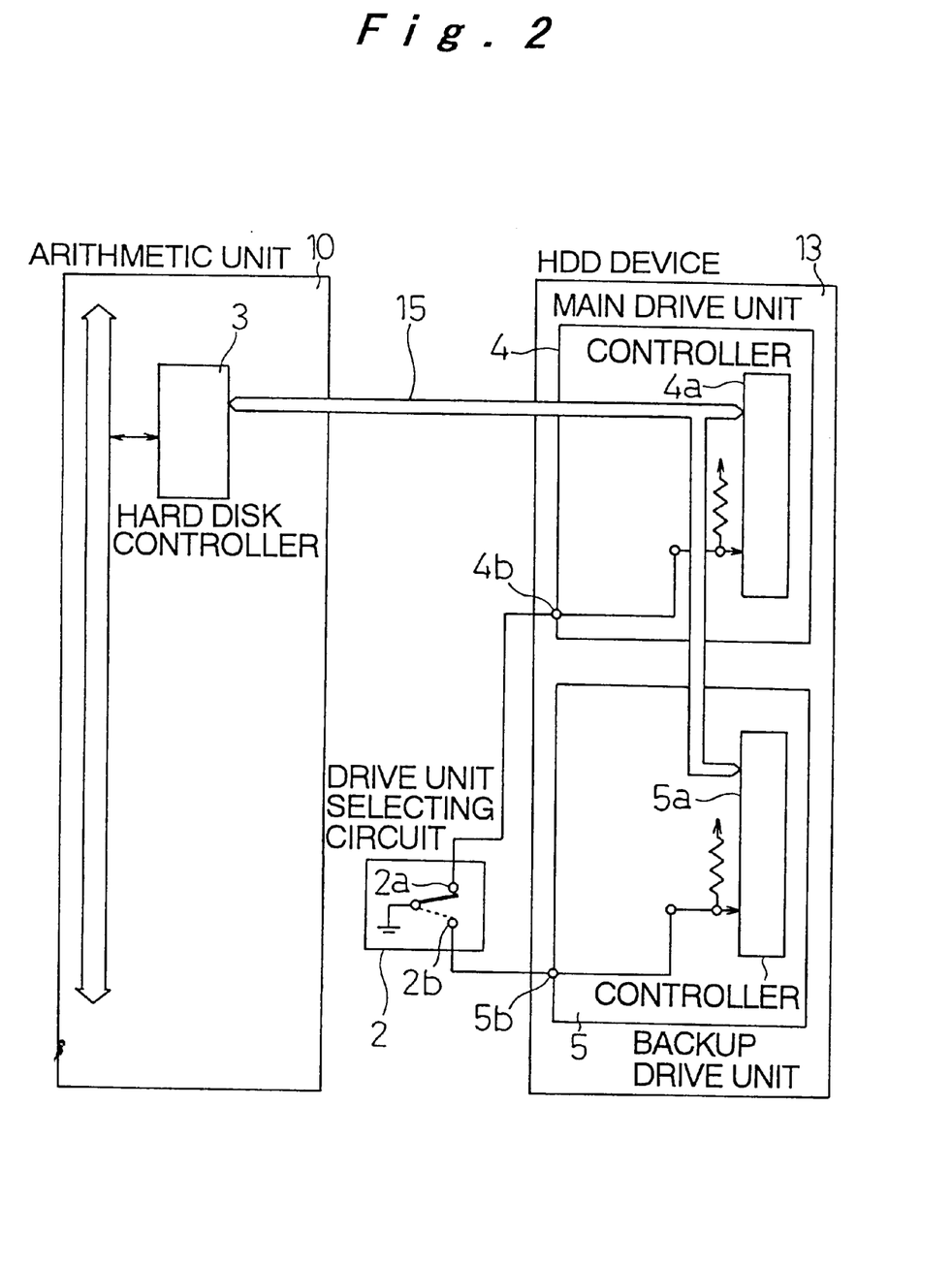
FIG. 2 is a circuit diagram showing the constitution of signal transmission in the same aspect of the embodiment.

FIG. 2 is a circuit diagram showing the constitution of signal transmission in a computer device 1. Normally, at least two or more drive units are connected to the HDD device 13. In this aspect of the embodiment, two drive units of one main drive unit 4, and one backup drive unit 5 are provided. A signal transmitting line 15 between the arithmetic unit 10 and the HDD device 13 is composed of a data bus for transmitting and receiving a signal, an address bus for specifying a data read/write address, and a selection signal for selecting one of the drive units.

A hard disk controller 3 inside the arithmetic unit 10 is connected via the signal transmitting line 15 to a controller 4a of the main drive unit 4, and a controller 5a of the backup drive unit 5 inside the HDD device 13, and performs the reading and writing of data inside the drive units.

Respective selection terminals 4b, 5b of the main drive unit 4, and the backup drive unit 5 inside the HDD device 13 are connected to selection terminals 2a, 2b, respectively, inside the drive unit selecting circuit 2. Selection terminals 2a, 2b are of a contact constitution so as to operate alternately, and the connections therefor can be set in accordance with the switch 51 of the drive unit selecting circuit 2. The constitution is such that by setting this switch 51 to the main drive unit 4, the current drive unit, which is connected to the arithmetic unit 10, can be readily switched to the main drive unit 4, and by setting the switch 51 to the backup drive unit 5, the current drive unit, which is connected to the arithmetic unit 10, can be readily switched to the backup drive unit 5.

In the main drive unit 4, there is stored an OS program (including the device driver program) required for starting up the computer system, an APL program for describing the contents of computer processing, and APL program processing data such as component mounting data, information for production control, and error logging data.

Error logging data may record the history of errors that have occurred during the writing of data in the HDD device. By informing the operator of such errors with a message, it is possible to prevent a breakdown of the apparatus caused by the malfunction of the HDD device of the computer device 1.

In the backup drive unit 5, there is also stored the exact programs and data as are in the main drive unit 4 including the OS program. Further, the computer system is programmed so that, during APL program processing, processing results are written to both the main drive unit 4 and the backup drive unit 5 as new processing data.

Because the contents of the main drive unit 4 and the backup drive unit 5 are constantly kept the same in this manner, the computer device 1 can be started up, and processing can be carried out normally in accordance with the drive unit selecting circuit 2, at normal times, when the main drive unit 4 is connected to the arithmetic unit 10, and even at failure time, when the backup drive unit 5 is connected to the arithmetic unit 10.

According to the above constitution, even when the computer device 1 is installed inside the apparatus main unit of a component mounting apparatus, and a malfunction occurs in the main drive unit 4 inside the HDD device 13, because it is possible to switch to the backup drive unit 5 without changing programs, or replacing a drive unit, recovery can be achieved in a short period of time.

Figure 3:
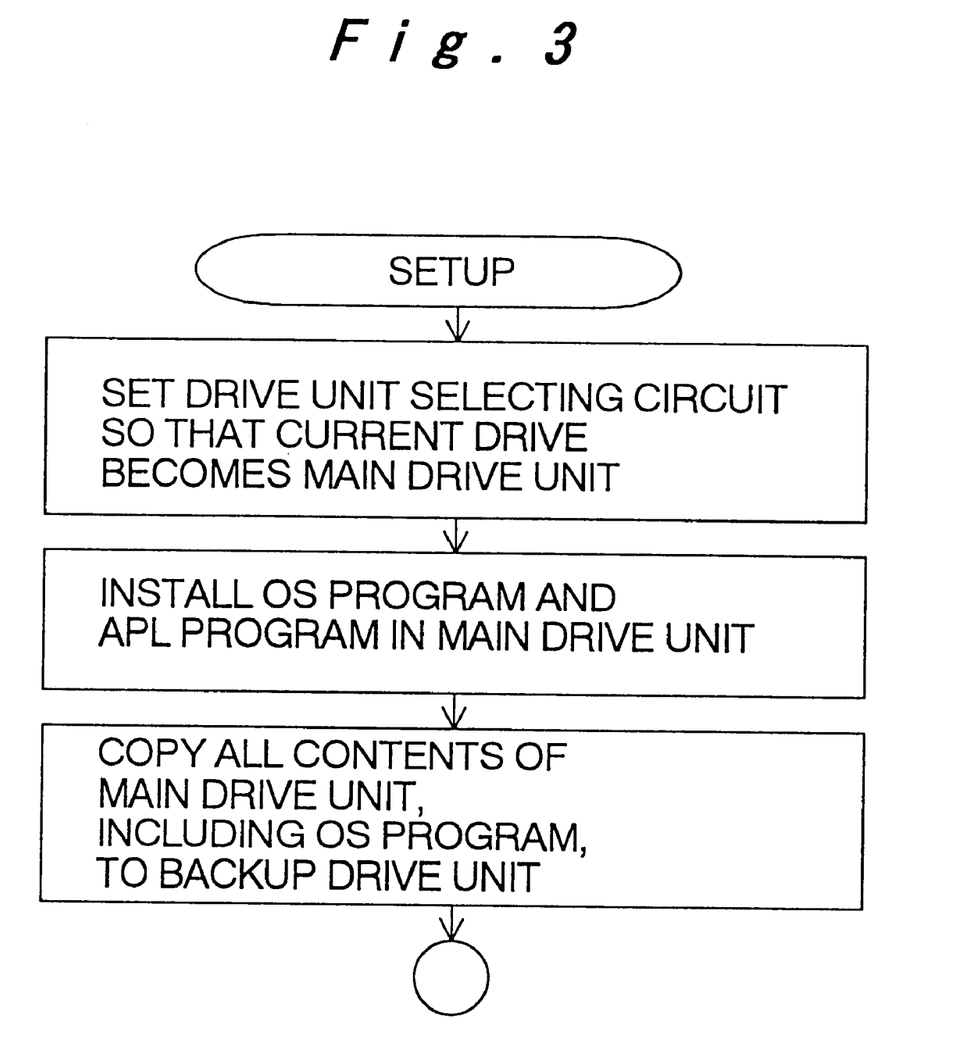
FIG. 3 is a flowchart of a method for storing programs in a hard disk drive in the same aspect of the embodiment.

FIG. 3 shows a method for storing an OS program and an APL program in the main drive unit 4 and the backup drive unit 5. First, using the switch 51 of the drive unit selecting circuit 2 on the front surface of the computer device, to set the current drive unit, which is connected to the arithmetic unit 10, so that it becomes the main drive unit 4, and store an OS program and an APL program in the main drive unit 4. Next, copy the contents of the main drive unit 4 to the backup drive unit 5 so that everything is the same, including the OS program.

Figure 4:
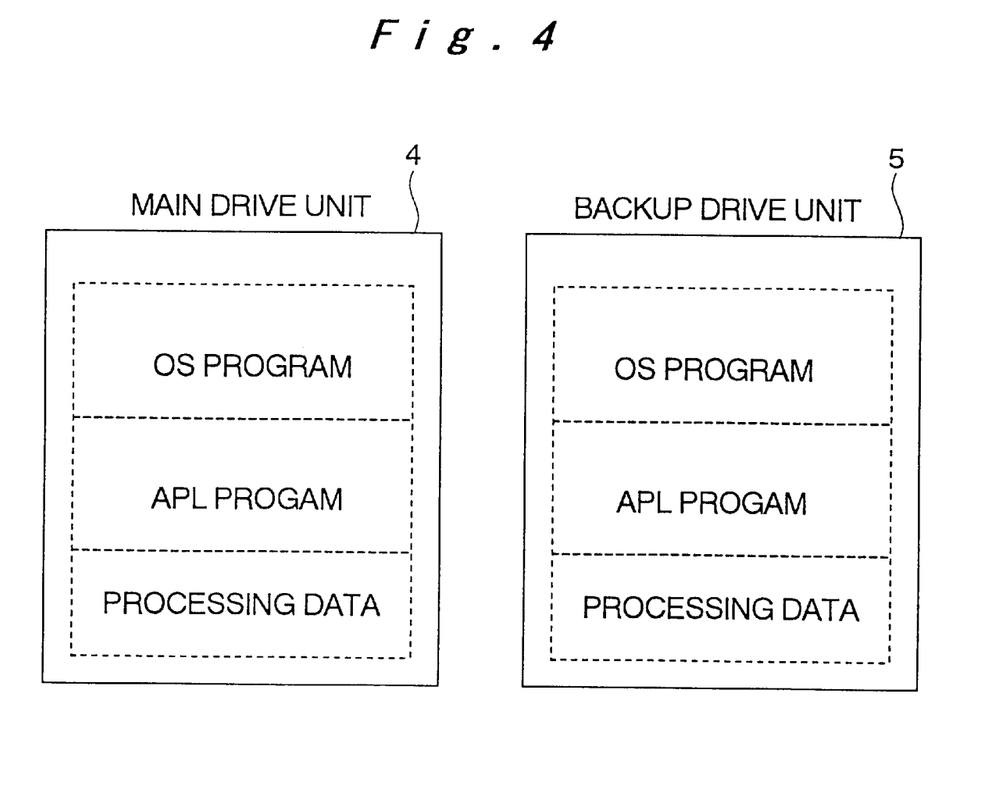
FIG. 4 is a schematic diagram of a program storage state of a main drive unit and backup drive unit in the same aspect of the embodiment.

FIG. 4 shows the programs that are stored in the main drive unit 4 and the backup drive unit 5, respectively. Exactly the same OS program, APL program, and APL program processing data are stored in both drive units 4, 5.

Figure 5:
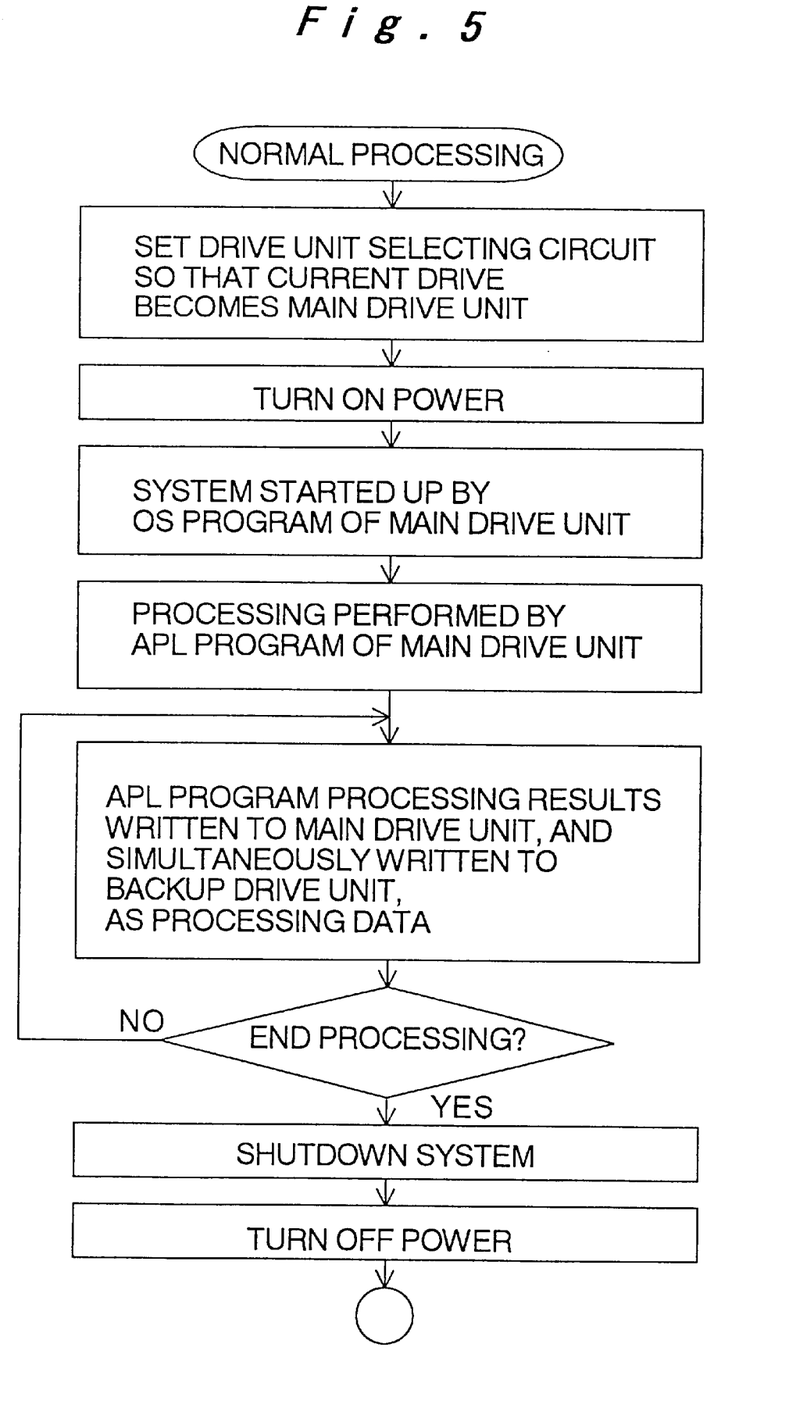
FIG. 5 is a flowchart of normal processing in the same aspect of the embodiment.

Normal processing, when both the main drive unit 4 and the backup drive unit 5 in the above constitution are operating normally, will be explained by referring to FIG. 5. In this case, during APL program processing following computer startup, APL program processing results are stored as processing data in both the main drive unit 4 and the backup drive unit 5.

First, using the switch 51 of the drive unit selecting circuit 2 on the front surface of the computer device 1, the current drive unit of the arithmetic unit 10 is set to be the main drive unit 4. Next, when the power source of the computer device 1 is turned ON, the system starts up with the OS program, APL program, and processing data of the main drive unit 4. During APL program processing, processing results are written as processing data to the main drive unit 4 and the backup drive unit 5 simultaneously.

In case APL processing time is limited, in normal processing, processing results can be written to the main drive unit 4 only, and after a fixed period of time, can be collectively written to the backup drive unit 5.

Figure 6:
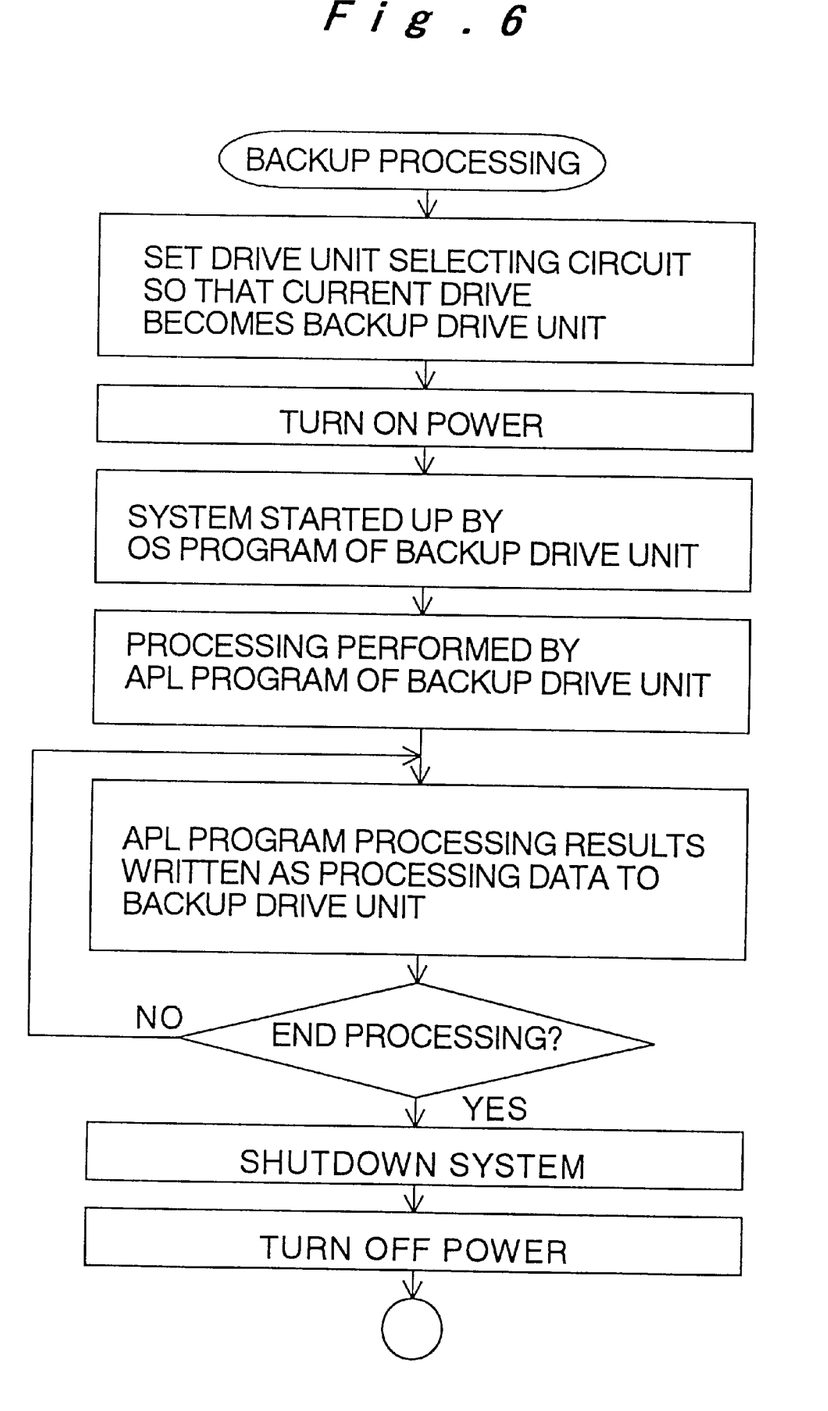
FIG. 6 is a flowchart of backup processing in the same aspect of the embodiment.

Next, backup processing, when the main drive unit 4 fails, and operation is switched to the normal backup drive unit 5, will be explained by referring to FIG. 6. In this case, during APL program processing following computer startup, APL program processing results are stored as processing data in the backup drive unit 5.

First, using the drive unit selecting circuit 2 switch on the front surface of the computer device 1, the current drive unit of the arithmetic unit 10 is set to be the backup drive unit 5. Next, when the power source of the computer device 1 is turned ON, the system starts up with the OS program, APL program, and processing data of the backup drive unit 5. During APL program processing, processing results are written as processing data to the backup drive unit 5.

As explained above, the computer device is constituted such that at least two or more drive units are provided in the HDD device 13, two of these being a main drive unit 4 and a backup drive unit 5, and in both thereof are stored an OS program required for computer system startup, an APL program, which describes the contents of computer processing, and APL program processing data. The computer system is programmed so that, after computer system startup, the results of processing during APL program processing are written to both the main drive unit 4 and the backup drive unit 5 as processing data. The contents of the main drive unit 4 and the backup drive unit 5 can thus be kept the same at all times.

Further, setting the hard disk drive from the arithmetic unit 10 makes it possible to change the current drive by simply operating the switch of the drive unit selecting circuit 2 provided on the front surface of the computer device 1, without having to change the OS program or the APL program at that time.

As described above, according to the present invention, switching from a failed drive unit to a normal drive unit can be accomplished easily, without altering software settings, or changing the APL program, and without disassembling the computer device and replacing the internal hard disk unit. Installing the computer device inside the production equipment main unit makes it possible to achieve recovery in a short period of time even when a malfunction occurs in the HDD device thereof.

By way of example, the switching of the drive unit selecting circuit 2 may be made as described below.

If the computer device 1 fails to access the main drive unit 4 of the HDD device 13 because of the termination of its life or any other reasons during the power-on self-test, the drive unit selecting circuit 2 is switched over to the backup drive unit 5.

If the reading of data from the HDD device 13 is interrupted or any other errors occur during the reading of data caused by vibration generated in the apparatus or any other reasons, the boot program of the computer device 1 starts over the reading by its re-try function. If the data can be read successfully at this second time, it is judged that the main drive unit 4 is still operable and the drive unit selecting circuit 2 is not switched over. Thus next time the system is started, the main drive unit 4 will be accessed.

If the boot program of the computer device 1 fails to read data from the HDD device 13 for the reasons attributable to ambient conditions such as low or high temperature, the reading of data is started over again by the re-try function of the computer device 1. This may happen after the plant has been shut during holidays, during which there is no air-conditioning. If the data can be read successfully at the second time, it is judged that the main drive unit 4 is still operable and the drive unit selecting circuit 2 is not switched over. Thus next time the system is started, the main drive unit 4 will be accessed.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A component mounting apparatus for mounting an electronic component onto a substrate, comprising:

a mounting head member for removing electronic components from an electronic component feeder unit and positioning the electronic components on the substrate mounted on an X-Y table; and a controller for coordinating the mounting of electronic components on the substrate, wherein the controller includes a housing member, an input device for input operation data, a display device for outputting the operation data, a hard disk drive device which stores a data processing program and the operation data, and has two or more drive units including a main drive unit and a backup drive unit, an arithmetic unit which executes data processing in accordance with the data processing program inside the hard disk drive device, and stores data processing results in the hard disk drive device, means for interconnecting the arithmetic unit and the drive units in the hard disk drive device, a drive unit selecting circuit for selectively connecting a drive unit to be used and the arithmetic unit, and a manual switch, provided on the outside of the controller in a recessed portion of the housing member accessible only by a tool for contacting the manual switch, for switching the drive unit selecting circuit for selecting a drive unit to be used, wherein the main drive unit and the backup drive unit of the hard disk drive device have identical contents stored therein including data for mounting components on substrates, data for production control, and data processing programs, and after computer system start up, results of data processing executed by the arithmetic unit are written to both of the main drive unit and the backup drive unit so that the contents of both of the main drive unit and the backup drive unit are maintained the same, and the switch when activated to select the backup drive unit and when power is applied starts the operating system program, the application program and the application program processing data from the backup drive unit and the data processing results are written as processing data to the backup drive unit.

2. The component mounting apparatus of claim 1, wherein the arithmetic unit stores data processing results simultaneously in both the main drive unit and the backup drive unit.

3. The component mounting apparatus of claim 1 further including an indicator light display including a first indicator light for the main drive unit, a second indicator light for the backup drive unit and a third indicator light indicating the status of a read/write operation of the hard disk drive device.

4. A computer device comprising:
an input device for inputting operation data;
a display device for outputting operation data;
a hard disk drive device which stores a data processing program and the operation data, and has two or more drive units including a main drive unit and a backup drive unit;
an arithmatic unit which executes data processing in accordance with the data processing program inside the hard disk drive device, and stores data processing results in the hard disk drive device;
means for interconnecting the arithmetic unit and the drive units in the hard disk device;
a drive unit selecting circuit for selectively connecting the arithmetic unit with one of the drive units inside the hard disk drive device; and
a manual switch provided on the outside of the computer device, in a recessed portion of a housing member accessible only by a tool for contacting the manual switch, for switching the drive unit selecting circuit, wherein
the main drive unit and the backup drive unit of the hard disk drive device have identical contents stored therein including an operating system program, an application program, and application program processing data,
after a computer system startup, results of data processing executed by the arithmetic unit are written to both of the the main drive unit and the backup drive unit so that the contents of both of the main drive unit and the backup drive unit are maintained the same, and
the switch when activated to select the backup drive unit and when power is applied starts the operating system program, the application program a the application program processing data from the backup drive unit and the data processing results are written as processing data to the backup drive unit.

5. The computer device according to claim 4 that is installed in a main apparatus unit of production equipment and used as a controller.

6. The computer device of claim 4, wherein the arithmetic unit stores data processing results simultaneously in both the main drive unit and the backup drive unit.

7. The computer device of claim 4 further including an indicator light display including a first indicator light for the main drive unit, a second indicator light for the backup drive unit and a third indicator light indicating the status of a read/write operation of the hard disk drive device.

8. A method of restoring a controller that is installed in an apparatus main unit of production equipment and comprises a hard disk drive device and an arithmetic unit, when the hard disk drive device malfunctions because of external factors to which the production equipment is subject, wherein
two or more drive units including a main drive unit and a backup drive unit are provided in the hard disk drive device, said main drive unit storing data for mounting components on substrates, data for production control, and data processing programs, said backup drive unit having identical contents of the main drive unit, and after computer system startup, results of data processing executed by the arithmetic unit are written to both of the main drive unit and the backup drive unit so that the contents of both of the main drive unit and the backup drive unit are maintained the same, and one of the drive units in the hard disk drive device being connected to the arithmetic unit during normal production further including an indicator light display having a first indicator light for the main drive unit, a second indicator light for the backup drive unit and a third indicator light indicating the status of a read/write operation of the hard disk drive device, comprising the steps of
verifying an active status of the drive units from the first and second indicator lights and activating a switch only when the third indicator light indicated no read/write operation is being performed, and
switching the drive unit connected with the arithmetic unit to another drive unit in the hard disk drive device.

9. A component mounting apparatus for mounting an electronic component onto a substrate, comprising:
a mounting head member for removing electronic components from an electronic component feeder unit and positioning the electronic components on the substrate mounted on an X-Y table; and
a controller for coordinating the mounting of electronic components on the substrate, wherein the controller includes
a housing member,
an input device for inputting operation data,
a display device for outputting the operation data,
a hard disk drive device which stores a data processing program and the operation data, and has two or more drive units including a main drive unit and a backup drive unit,
an arithmatic unit which executes data processing in accordance with the data processing program inside the hard disk drive device, and stores the same data processing results in the hard disk drive device, to both the main drive unit and the backup drive unit;
means for interconnecting the arithmetic unit and the drive units in the hard disk drive device,
a drive unit selecting circuit for selectively connecting a drive unit to be used and the arithmetic unit,
an indicator light display including a first indicator light for the main drive unit, a second indicator light for the backup drive unit and a third indicator light indicating the status of a read/write operation of the hard disk drive device,
a manual switch provided on the outside of the controller in a recessed portion of the housing member accessible only by a tool for contacting the manual switch and switching the drive unit selecting circuit for selecting a drive unit to be used, wherein
the main drive unit and the backup drive unit of the hard disk drive device have identical contents stored therein including data for mounting components on substrates, data for data processing programs, and
after computer system startup, results of data processing executed by the arithmetic unit are written to both of the main drive unit and the backup drive unit so that the contents of both of the main drive unit and the backup drive unit are maintained the same.

* * * * *